UNITED STATES PATENT OFFICE.

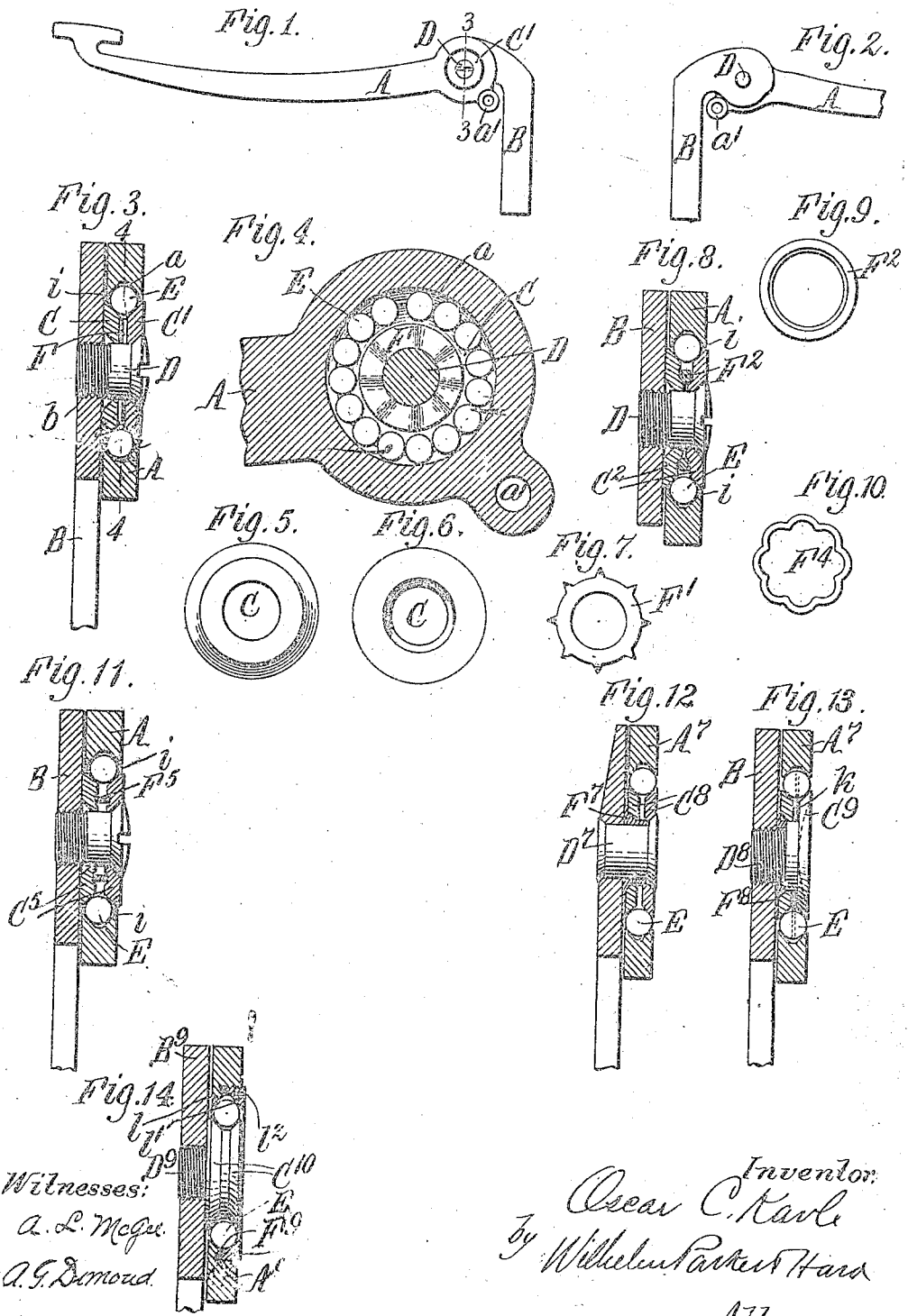

OSCAR C. KAVLE, OF SYRACUSE, NEW YORK, ASSIGNOR TO HARVEY A. MOYER AND EMMIT G. LATTA, OF SYRACUSE, NEW YORK.

BALL-BEARING FOR THE TYPE-BARS OF TYPE-WRITING MACHINES.

1,060,003.

Specification of Letters Patent. Patented Apr. 29, 1913.

Application filed October 9, 1906. Serial No. 338,190.

*To all whom it may concern:*

Be it known that I, OSCAR C. KAVLE, a citizen of the United States, residing at Syracuse in the county of Onondaga and State of New York, have invented a new and useful Improvement in Ball-Bearings for the Type-Bars of Type-Writing Machines, of which the following is a specification.

This invention relates more particularly to ball bearings for the type-bars of type-writing machines.

The primary object of the invention is to provide an adjustable ball bearing of a construction which can be manufactured and assembled at the minimum cost, and which will be rigid and durable but very compact, thereby especially adapting it for the type-bars of typewriting machines which, on account of the available space in the machine for the large number of bearings required, must be very closely arranged.

Another object of the invention is to improve the construction of ball bearings in the respects hereinafter described and set forth in the claims.

These objects are attained in the different constructions shown in the drawings and hereinafter described.

In all of the bearings illustrated and described a single row of balls is employed in an annular race way formed between the bearing faces of the type-bar or movable member and the supporting hanger or fixed member. One of the members has a cone, or part with a conical bearing face, which is adjustable toward the opposing cone or part to take up looseness or to compensate for wear in the bearing, and a detent or device is employed which will yield to allow the adjustment of the cone but will prevent the same from movement in the use of the bearing and which is located between the adjustable cone and the complementary cone or a part of the member supporting said cones. By reason of the stated location of the detent the bearing provided therewith will occupy no more space or not appreciably more space than the same bearing without the detent, and a material saving in size is effected as compared with a bearing having an external or exposed securing device for the adjustable cone. The detent as well as other parts of the bearing can be differently constructed and arranged, as will hereinafter appear.

In the accompanying drawings: Figure 1 is an elevation of one side of a full size type-bar and hanger connected by a ball bearing embodying the invention. Fig. 2 is a fragmentary elevation of the opposite side thereof. Fig. 3 is a sectional elevation thereof, on an enlarged scale, in line 3—3, Fig. 1. Fig. 4 is an enlarged transverse section thereof in line 4—4, Fig. 3, showing the detent in elevation. Figs. 5 and 6 are enlarged elevations respectively of the inner and outer sides of one of the bearing cones detached. Fig. 7 is an enlarged detached side elevation of a detent of different construction adapted for use in the bearing shown in Fig. 3. Fig. 8 is an enlarged sectional elevation, similar to Fig. 3, of a bearing of modified construction. Figs. 9, 10 are enlarged detached elevations of detents of different construction suitable for the bearing shown in Fig. 8. Fig. 11 is an enlarged sectional elevation of a bearing of different construction. Figs. 12, 13 and 14 are enlarged sectional elevations of three other modifications of the bearing.

Like letters of reference refer to like parts in the several figures.

The construction of the bearing which is considered at the present time to be the most desirable is shown in Figs. 1–6, and this construction will first be described. A represents the type-bar or movable member, and B the hanger or fixed member. The type-bar and hanger consist of simple flat sheet-metal stampings, and they require no machine work other than to form an internal annular ball groove $a$ in the type-bar and to screw thread the opening $b$ in the hanger, and also, if desired, to reduce the thickness of the eye $a'$ on the type-bar for the attachment of the link or part for operating the type bar. C C' represent two complementary bearing cones, or parts provided with conical bearing faces, which are fastened to the hanger by a screw or connecting an adjusting device D which has a smooth cylindrical stem passing through central holes in the cones and is screwed into the threaded hole in the hanger. The cones are located within the opening in the type-bar, and the internal groove of the latter and the bearing faces of the cones form an annular race for a single circular row or series of balls E. The cones are flat perforated disks stamped from sheet metal and afterward pressed to the form shown, that is, to provide the bevel or conical bearing face for the balls on one side of each disk and a countersink or conical enlargement of the central opening on the opposite side of the disk. The countersink in the cone C', which is adjustable, is for the purpose of receiving the conical head of the screw D, while the opening of the other cone is similarly shaped for economy in manufacture and also to provide space next to the screw-threaded hole of the hanger to receive any part of the thread that may be raised or turned outwardly in tightening up the screw, so that such raised portion of the thread cannot prevent the cone C from seating flat against the hanger. By forming the cones in this way by heavy pressure, the metal is condensed and a cone produced which after case hardening is much more serviceable than a cone machined from steel and case hardened in the usual way. The cones can be made in this way at a comparatively small cost, and, which is more important, they can be made more exact as to size which, owing to their small size and the limited range of adjustment in the bearing, is a vital consideration. The pressed cones can be made in large numbers of uniform size, or without the minute variation which would be caused by the wear of tools if made in the usual way. Not only the external form of the cones is insured, but their central openings through which the connecting screw passes will be exactly alike. Thus by making the cylindrical stems of the screws exactly the same size and to nicely fit the holes of the cones, the cones will be held truly concentric with the axis of the bearing. The ball grooves in the eype-bars or movable members cannot be machined as accurately as the cones are made, and to compensate for the slight variation thus caused, as well as to enable the adjustment of the bearing to take up looseness, and to compensate for wear, the cone C' is made adjustable relative to its complementary cone, and a detent or device F is employed for holding the cone in the adjusted position and preventing the same and the connecting screw from working loose. This device which, for brevity, will be hereinafter termed a "detent" is preferably constructed and arranged as shown in Figs. 3 and 4. It consists of a thin annular disk or ring of spring metal which is arranged around the connecting screw between the cones and is fluted or corrugated, as shown, to form an equal number of opposite projections to bear against the inner face of each of the cones. When the screw is driven into the hanger the detent will be flattened somewhat between the cones and will act by its resilience to press the inner or fixed cone C against the hanger and the other or adjustable cone C' against the head of the screw with force enough to cause sufficient friction to effectually hold the screw from unscrewing and prevent the cones from turning on the screw in the use of the bearing. The friction can be regulated by employing a detent of proper stiffness. The best results are secured by using a detent stiff enough to require the application of considerable force to drive the screw in far enough to properly adjust the bearing. The described construction and location of the detent device between the bearing cones does not increase the axial length of the bearing and the complete bearing will not require more space in the segment than it would if the detent were omitted. The importance of this will be understood when it is remembered that the available space for each hanger and typebar at the central portion of the segment in a front-strike machine, in which the hangers are arranged in a single row, is only from one-eighth to nine-sixty-fourths of an inch at the upper ends of the hangers. If the bearings were of greater width they would have to be arranged in two rows, which is objectionable. The yielding detent also holds the fixed cone flat against the hanger and the adjustable cone parallel therewith, so that in case of looseness from wear enough to permit lateral movement of the type-bars, the parallel cones will still cause the bar to vibrate in the proper line radial to the printing point. Other advantages of the described construction are that the single part hanger affords a longer bearing for the threaded part of the adjusting screw than if it were made of two parts in a bearing of the same length; both the hanger and its connected parts that support the type-bar are less expensive to make; the most minute adjustment is possible; no tools other than a screw driver are required to make the adjustment; as there is no lock nut or screw the adjustment can be made quicker and without allowance for the action of such a device by simply forcing in the adjusting screw until the looseness is taken up; and as the bearing parts are not connected by a screw thread, they will not be moved to an eccentric position in adjusting them, Yielding detents of different construction and made of different material could be used and produce the same or the chief advantages enumerated. Fig. 7 shows a detent F' in the form of a thin metal spring ring having a series of projecting points which are turned alternately in opposite directions to bear against the inner faces of the two cones. This device acts in a similar manner to the corrugated detent above described. It is not necessary for the detent to be made of spring metal to permit the adjustment of the bearing and to securely lock the parts from movement. A ring of soft metal or other suitable material adapted to compress or yield under pressure in adjusting the adjustable cone will give good results.

Fig. 8 shows a construction in which the type-bar A, hanger B and connecting screw D are the same as described, but the cones $C^2$ have small conical faces on their inner sides surrounded by a soft metal detent or ring $F^2$, Figs. 8 and 9. When the cones are forced together by tightening up the screw, the ring will be expanded circumferentially and compressed laterally and will create the necessary friction to hold the cones and connecting screw. Instead of the soft metal detent ring, an irregular shaped ring $F^4$, Fig. 10, could be employed in this construction.

The construction shown in Fig. 11 is similar to that of Fig. 3 except that opposite grooves are formed in the inner faces of the cones $C^5$ to receive a short copper or soft metal tube $F^5$. In forcing in the screw the tubular detent will buckle or yield enough to allow the adjustment to be made and will cause the friction necessary to hold the parts from turning.

In the constructions shown in Figs. 3, 8 and 11, the type-bar is made somewhat thicker than the diameter of the balls and provided with thin annular flanges $i$ which extend inwardly at opposite sides of the balls nearly to the cones, and the cones are thick enough to project beyond the side faces of the type-bar to provide clearance between the type-bar and hanger, but when a more compact or thinner bearing is required, the type-bar $A^7$ is made of stock no thicker than the diameter of the balls and the cones $C^8$ thin enough not to project beyond the sides of the type-bar, as shown in Fig. 12. To still further reduce the space required for this construction the upper part of the hanger is chamfered, as shown, to permit it to clear the next type-bar in the segment, and a soft metal detent washer $F^7$ is employed which is located between the fixed cone and the hanger and acts to space the type-bar from the hanger. The washer has an integral tubular extension that fills the conical hole of the fixed cone and extends through both cones. A rivet $D^7$ is used in this construction instead of the screw and when it is headed down the tubular part of the detent is expanded slightly between the cones. This is a very compact and serviceable bearing and it can be adjusted for wear, when necessary, by simply heading down the rivet a little more.

If it is desired to lessen the number of balls in the bearing and thus reduce its cost, three or four balls can be used with a separator for spacing them equal distances apart.

In this event the construction shown in Fig. 13 is preferable, in which the adjustable cone $C^9$ is made integral with the screw $D^8$ which has a cylindrical shouldered stem portion extending into the hole of the fixed cone, and bearing against a tubular extension on a soft metal detent washer $F^8$ soldered or otherwise fixed to the fixed cone. The screw has a screw driver slot (shown by dotted lines). The cylindrical stem of the screw forms a smooth seat for a ball separator $k$, which may be of any suitable construction, and the shoulder of the stem will compress the detent washer in the conical hole of the fixed cone when the screw is forced in and cause friction enough to hold the screw and adjustable cone from turning.

In the constructions thus far described the type-bar is provided with the ball groove and the cones are attached to the hanger. A mere reversal of this would be to form the groove in the hanger and attach the cones to the type-bar.

The cones $C^{10}$ in Fig. 14 are both formed in one piece on a screw $D^9$ screwed into hanger $B^9$, and the type-bar $A^9$ is formed with a fixed bearing part or cup $l$ and an adjustable cup $l'$ which is threaded and screwed into the type-bar. The cup can be turned by a spanner wrench engaged in small holes $l^2$ therein, or by other means. A soft metal detent ring $F^9$ between the fixed and adjustable cups will allow the adjustment of the latter and hold it by friction when adjusted.

The detents made of spring metal are advantageous over those made of soft metal or yielding material in that they will permit the adjustment to be relieved if inadvertently made too tight.

In all of the constructions described a yielding detent or device is employed which will yield to allow the adjustment and will cause sufficient friction between the parts to maintain the adjustment, and this device is arranged between the adjustable cone or part and a part on the member supporting such adjustable cone or part; that is, within the bearing so that there is no projecting holding device which will prevent the close arrangement of a series of the bearings in a segment.

I claim as my invention:

1. The combination of a type-bar member, a supporting member therefor, a row of balls between said members, opposed bearing cones supported by one of said members, one of which cones is adjustable toward the other, and a separate annular detent device which is located in the plane of said row of balls and holds said adjustable cone stationary but which is capable of yielding in the direction of the axis of the bearing to allow adjustments of said cone, substantially as set forth.

2. The combination of a type-bar member, and a supporing member therefor arranged side by side, a row of balls between said members in the plane of one member, bearing cones supported by one of said members at one side thereof, one of which cones is adjustable toward the other, and a separate detent d /ice which is arranged between said adjustable cone and the supporting member therefor and is compressible in the direction of the axis of the bearing to allow adjustments of said adjustable cone either toward or from the other cone and hold said adjustable cone by friction in the different adjustments thereof, substantially as set forth.

3. The combination of a type-bar member and a supporting member therefor having bearing ends arranged side by side, bearing cones supported by one of said members at one side thereof within a hole in the other member, one of said cones being adjustable toward the other, a row of balls between said cones and said other member in the plane of the latter, and a separate annular detent device which is arranged substantially in the plane of said balls and holds said adjustable cone stationary but is capable of yielding in the direction of the axis of the bearing to allow repeated adjustments of said cone, substantially as set forth.

4. The combination of a type-bar supporting member, a movable type-bar member, both members consisting of single flat pieces of uniform thickness throughout their length, a row of balls between said members, bearing cones supported by one of said members, one of which cones is adjustable toward the other, and an annular yielding detent device which is arranged in a position between said adjustable cone and the member supporting said cone and holds said adjustable cone stationary but which is capable of yielding laterally to allow adjustments of said cone, either toward or from the other cone and hold said adjustable cone in the different adjustments thereof, substantially as set forth.

5. The combination of a fixed member and a movable type-bar member, each composed of a flat piece of metal and having parts arranged side by side, one of said members having an opening surrounded by an internal ball groove, a pair of opposable cones separate from said other member and located in said opening and forming with said groove a ball race, a device for connecting said cones to said other member and adjusting one of said cones, a single row of balls in said race, and an independent annular detent device located between the cones for holding the adjustable cone and permitting adjustments thereof toward and from the other cone, substantially as set forth.

6. The combination of a fixed member and a movable type-bar member, each composed of a flat piece of metal and arranged with overlapping parts, one of said members having an opening surrounded by an internal ball groove, a pair of detachable cones separate from said members and located in said opening and forming with said groove a ball race, a screw connecting said cones to one side of said other member, and a yielding frictional detent located between said cones which holds said screw in adjusted positions, substantially as set forth.

7. The combination of a movable type-bar member, and a supporting member, one of said members having an internal ball groove, and the other member having an opening for a connecting device, a connecting device seated in said opening, a pair of opposable cones having a sliding bearing on said connecting device, an annular row of balls supported in said groove by said cones, and an annular yielding device for holding said cones parallel and preventing them from turning on said connecting device, substantially as set forth.

8. The combination of a fixed member and a movable type-bar member, one of which members is provided with an internal ball groove, cones which form with said groove, a ball race and have opposite parallel faces, a single row of balls in said race, a device arranged centrally of said cones for connecting them to said other member and adjusting one of said cones, and an annular laterally yielding detent surrounding said adjusting device between and bearing against said parallel faces of the cones for holding them parallel and stationary by friction, substantially as set forth.

9. The combination of a fixed member and a movable type-bar member, one of which members has an annular internal ball groove and the other a screw-threaded opening, a pair of separate opposable cones having parallel inner end faces, a single row of balls supported by the cones within said ball groove, an annular laterally yielding detent arranged between the cones and contacting with said inner end faces for holding the cones stationary by friction, and a screw entering said screw-threaded opening for compressing the detent and locking the cones to the member having the screw-threaded opening, substantially as set forth.

10. The combination of a fixed member and a movable type-bar member supported thereby, an annular ball groove in one of said members and a screw-threaded opening in the other, a screw having a thread at one end and a head at the other with a plain cylindrical central part, a pair of cones having smooth central openings to fit the cylindrical part of the screw and mounted thereon, a single row of balls arranged between said annular groove and cones, and a laterally yielding device between the head of the screw and said member having the screw-threaded opening that will permit the cones to be adjusted by forcing the screw into said opening, substantially as set forth.

11. The combination of a fixed member and a movable type-bar member supported thereby and overlapping the same, an annular ball groove in one of said members, a screw seated in the other member, a pair of opposable cones on said screw, a single row of balls interposed between said groove and cones, and a device arranged between the cones which is yieldable in the direction of the axis of the bearing and acts to adjustably secure the cones, the said cones, screw, and yielding device being all arranged substantially within the thickness of the two overlapping parts, substantially as set forth.

12. The combination of a movable type-bar member and a supporting member, one of said members having an internal ball groove, and the other member having a screw-threaded opening, a screw seated in said opening, a pair of opposable cones supported by said screw, an annular row of balls supported in said groove by said cones, and independent means located between the planes of the outer sides of said members and acting by friction to lock one of said cones against the member having the screw-threaded opening and for adjustably locking the screw in said opening, substantially as set forth.

13. The combination of a stationary member and a movable type-bar member having overlapping parts, a row of balls between said members and located substantially in the plane of one of said members, bearing cones supported by one of said members, one of which cones is adjustable relative to the other, and a separate detent device which is located between the planes of the outer faces of the overlapping parts of said members and holds said adjustable cone stationary by friction but which is capable of yielding laterally to allow adjustment of said cone, substantially as set forth.

Witness my hand, this 4th day of Oct., 1906.

OSCAR C. KAVLE.

Witnesses:
CHESTER U. REID,
OTTO A. SCHILLY.